United States Patent
Luelfing et al.

(10) Patent No.: US 12,208,833 B2
(45) Date of Patent: Jan. 28, 2025

(54) METHOD FOR CONTROLLING A VEHICLE WITHIN A CONFINED SITE, CONTROL UNIT AND VEHICLE

(71) Applicant: ZF CV SYSTEMS GLOBAL GMBH, Bern (CH)

(72) Inventors: Ralph-Carsten Luelfing, Garbsen (DE); Klaus Plaehn, Seelze (DE); Janik Ricke, Uetze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/685,517

(22) PCT Filed: Jul. 28, 2022

(86) PCT No.: PCT/EP2022/071236
§ 371 (c)(1),
(2) Date: Feb. 22, 2024

(87) PCT Pub. No.: WO2023/025509
PCT Pub. Date: Mar. 2, 2023

(65) Prior Publication Data
US 2024/0262419 A1    Aug. 8, 2024

(30) Foreign Application Priority Data

Aug. 26, 2021    (DE) .................... 10 2021 122 051.3

(51) Int. Cl.
*B62D 11/08*    (2006.01)
*B60T 8/17*    (2006.01)
*B60T 8/1755*    (2006.01)

(52) U.S. Cl.
CPC ............ *B62D 11/08* (2013.01); *B60T 8/1708* (2013.01); *B60T 8/17551* (2013.01)

(58) Field of Classification Search
CPC .... B62D 11/08; B60T 8/1708; B60T 8/17551
(Continued)

(56) References Cited

U.S. PATENT DOCUMENTS 4,275,660 A * 6/1981 Forster .................. B62D 1/265
104/247
5,307,888 A * 5/1994 Urvoy .................... B62D 11/04
180/6.7

(Continued)

FOREIGN PATENT DOCUMENTS

CN    109019443 A * 12/2018 ............... B62D 5/06
CN    116353348 A * 6/2023
(Continued)

*Primary Examiner* — Richard A Goldman
(74) *Attorney, Agent, or Firm* — LEYDIG, VOIT & MAYER, LTD.

(57) ABSTRACT

A method for controlling a vehicle within a confined site, the method including, following a determination that there is no steering system available in a vehicle that can be controlled by steering control signals generated in automated fashion in order to influence a steering angle of wheels of a steered vehicle axle of the vehicle in automated fashion, specifying a path between a starting area and a specified destination area within the confined site, and generating drive control signals and steering braking control signals such that, during subsequent automated control of a drive system and of a brake system using the control signals, the vehicle moves from the starting area along the path to the specified destination area, and the steering angle varies owing solely to automated control of the brakes of the brake system.

19 Claims, 2 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 5,383,531 | A * | 1/1995 | Yoshioka | B60K 23/0808 280/93.506 |
| 6,279,674 | B1 | 8/2001 | Lissel et al. | |
| 6,648,426 | B1 * | 11/2003 | Boettiger | B60T 8/1755 303/146 |
| 2003/0221894 | A1 * | 12/2003 | Guldner | B60T 8/1755 180/402 |
| 2006/0055240 | A1 * | 3/2006 | Toyota | B60K 6/40 303/152 |
| 2008/0033615 | A1 * | 2/2008 | Khajepour | B60W 10/20 701/41 |
| 2011/0112722 | A1 * | 5/2011 | Kalkkuhl | B60T 8/1755 701/41 |
| 2012/0253625 | A1 * | 10/2012 | Canuto | B60T 11/21 701/72 |
| 2013/0030651 | A1 * | 1/2013 | Moshchuk | B60W 30/09 701/41 |
| 2016/0197535 | A1 * | 7/2016 | De Filippis | H02K 1/276 310/43 |
| 2017/0011568 | A1 * | 1/2017 | Romana | B60T 8/1703 |
| 2019/0270437 | A1 * | 9/2019 | Miller, Jr. | G05D 1/0891 |
| 2020/0062059 | A1 * | 2/2020 | Watling | B63H 1/34 |
| 2021/0086737 | A1 * | 3/2021 | Schumann | B60T 8/1755 |
| 2021/0129831 | A1 | 5/2021 | Hecker et al. | |
| 2022/0111895 | A1 * | 4/2022 | Schumann | B62D 15/025 |
| 2022/0187840 | A1 | 6/2022 | Balogh et al. | |
| 2022/0394516 | A1 * | 12/2022 | Shire | H04W 4/80 |
| 2023/0121593 | A1 * | 4/2023 | Labarbera | B60T 8/171 701/70 |
| 2023/0122952 | A1 * | 4/2023 | Labarbera | B60T 7/12 701/70 |
| 2023/0124821 | A1 * | 4/2023 | Labarbera | B62D 9/005 701/41 |
| 2023/0192188 | A1 * | 6/2023 | Visscher | F16H 37/0806 180/6.44 |
| 2023/0415813 | A1 * | 12/2023 | Jeon | B60W 30/045 |
| 2024/0075981 | A1 * | 3/2024 | Wyciechowski | B60W 40/105 |
| 2024/0092326 | A1 * | 3/2024 | Wyciechowski | B60T 8/52 |

FOREIGN PATENT DOCUMENTS

| | | | | |
|---|---|---|---|---|
| CN | 117730027 | A * | 3/2024 | ............ B60T 8/1708 |
| DE | 19632251 | A1 | 2/1998 | |
| DE | 102006046497 | A1 | 4/2008 | |
| DE | 102012104793 | A1 | 1/2013 | |
| DE | 102016116857 | A1 | 3/2018 | |
| DE | 102017102021 | A1 | 8/2018 | |
| DE | 102019108620 | A1 | 10/2020 | |
| DE | 102019128531 | A1 | 4/2021 | |
| EP | 2998175 | A1 | 3/2016 | |
| EP | 3293064 | A1 | 3/2018 | |
| EP | 3293065 | A1 | 3/2018 | |

* cited by examiner

METHOD FOR CONTROLLING A VEHICLE WITHIN A CONFINED SITE, CONTROL UNIT AND VEHICLE

CROSS REFERENCE TO RELATED APPLICATIONS

This application is a U.S. National Phase application under 35 U.S.C. § 371 of International Application No. PCT/EP2022/071236, filed on Jul. 28, 2022, and claims benefit to German Patent Application No. DE 10 2021 122 051.3, filed on Aug. 26, 2021. The International Application was published in German on Mar. 2, 2023 as WO 2023/025509 A1 under PCT Article 21(2).

FIELD

The invention relates to a method for controlling a vehicle, in particular utility vehicle, within a confined site, in particular a depot, to a control unit for carrying out the method, and to a vehicle.

BACKGROUND

Vehicles, in particular utility vehicles, which do not have an active automated steering system can be incorporated only to a limited extent into an autonomously operated depot or haulage depot as a confined site, because such vehicles cannot follow a specified path from a starting area to a destination area in fully automated fashion. This is possible only if a driver or operating person performs the driving function, in particular the steering function, which means that the depot requires more personnel than is necessary or desired. This is however undesired in the case of autonomously operating vehicles and/or depots. It is furthermore expensive to retrofit an active automated steering system.

It is known from the prior art to implement a steering function through wheel-specific control of service brakes (steering braking). In this regard, DE 10 2012 104 793 A1, DE 196 32 251 A1, EP 2 998 175 A1 and DE 10 2006 046 497 A1 describe, for example, ensuring the steering of a vehicle through the use of steering braking as a redundant fall-back level. Further steering braking functions are described in DE 10 2017 102 021 A1 and in DE 10 2019 108 620 A1.

Furthermore, in EP 3 293 064 A1 and EP 3 293 065 A1, a switching module is used to switch back and forth between steering by means of an automated steering system and steering by way of steering braking, wherein it is intended for automatic corrections to be performed using the relevant form of steering during the execution of autonomous driving maneuvers in the context of lane-keeping or lane-changing assistance.

SUMMARY

In an embodiment, the present disclosure provides a method for controlling a vehicle within a confined site, wherein the vehicle has a control unit that is designed to control a brake system and a drive system in the vehicle in automated fashion in order to move the vehicle in automated fashion along a specified path, the method comprising, following a determination that there is no steering system available in the vehicle that can be controlled by steering control signals generated in automated fashion in order to influence a steering angle of wheels of a steered vehicle axle of the vehicle in automated fashion, specifying a path between a starting area and a specified destination area within the confined site, and generating drive control signals and steering braking control signals such that, during subsequent automated control of the drive system and of the brake system using the control signals, the vehicle moves from the starting area along the path to the specified destination area, and the steering angle varies owing solely to automated control of the brakes of the brake system.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
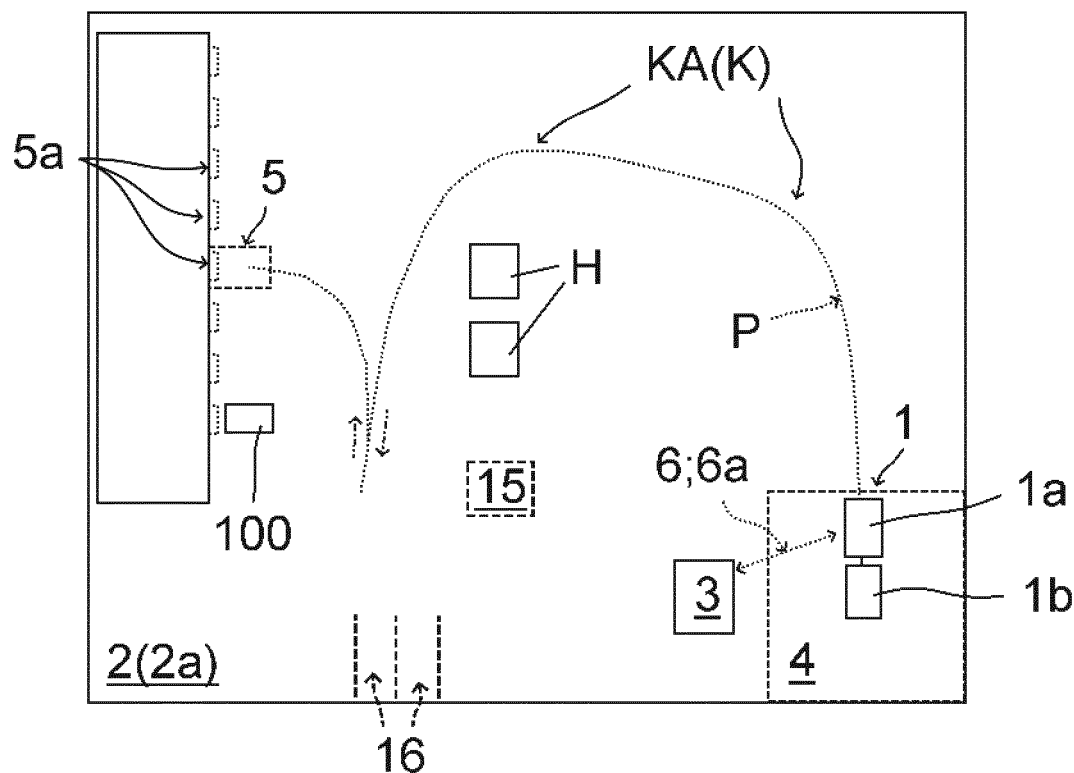
FIG. 1 illustrates a schematic view of a depot as a confined site.

In an embodiment, the invention provides a method for controlling a vehicle within a confined site, by means of which method any vehicle can, without great expenditure, be afforded access to a site that is operated in automated fashion. In an embodiment, a control unit and a vehicle are provided.

Accordingly, an embodiment of the invention provides a method for controlling a vehicle within a confined site, in particular within a depot, wherein the vehicle has a control unit that is designed to control a brake system and a drive system in the vehicle in automated fashion in order to move the vehicle in automated fashion, that is to say in driverless or autonomous fashion, along a specified path.

Following a determination that there is no steering system available in the vehicle that can be controlled by way of steering control signals generated in automated fashion in order to influence a steering angle of wheels of a steered vehicle axle of the vehicle in automated fashion, at least the following steps are carried out. Here, the "availability" relates both to the presence and to the functionality of such a steering system that is controllable in automated fashion, and this is therefore firstly determined. The determination is preferably performed in the starting area of the confined area, for example following arrival at the confined site.

The steps that are carried out are in particular as follows:
specifying a path between a starting area and a specified destination area within the confined site, wherein, in the specification of the path, it is for example taken into consideration that the steering angle at the wheels of the steered vehicle axle can only be influenced by automated control of brakes of the brake system in the vehicle;
generating drive control signals and steering braking control signals such that, during subsequent automated control of the drive system and of the brake system using said control signals, the vehicle moves from the starting area along the path to the specified destination area, and the steering angle varies owing solely to automated control of the brakes of the brake system.

According to an embodiment of the invention, a control unit for carrying out the method, and a vehicle having the control unit, are also provided.

A steering braking function is advantageously thus implemented, with which the vehicle, which in this case has no facility for automated setting of a steering angle by means of a conventional steering system, can nevertheless be steered in automated fashion within the confined site. This steering by means of the steering braking control signal is made possible by virtue of the brakes being controlled on a wheel-specific basis during automated control of the brake system using said steering braking control signal, such that a differential brake pressure is generated between wheels of the same vehicle axle, which results in a steering moment in the case of a positive scrub radius (kingpin offset) of the steered wheels in question, causing a steering angle associated with the differential brake pressure to be set at the wheels of the steered vehicle axle. In this way, a vehicle having a defective automated steering system or having no automated steering system can nevertheless be incorporated into a confined site that is operated in automated fashion, in particular a depot or a haulage depot, without the need for manual control which, for the purposes of mutual and safe coordination, is undesired within such depots that are operated in automated fashion.

Provision can furthermore be made whereby the path is specified such that, during automated control of the brake system using the steering braking control signals for the purposes of moving the vehicle along the path, the steering angle at the wheels of the steered vehicle axle remains below a specified limit steering angle, for example below 20°. Wear of the brakes of the vehicle is thus avoided, because, for greater steering angles, a correspondingly higher differential brake pressure would be required to generate a higher steering moment, which would also entail higher absolute brake pressures. This can already be taken into consideration in the planning or specification of the path, for example through the specification of fewer curve sections, and/or curvatures of correspondingly lesser degree, travel through which involves the limit steering angle at a maximum, in the curve sections provided, between the starting area and the destination area.

Provision is preferably furthermore made whereby the path is specified by a management system of the confined site or on a control unit in the vehicle. The management system can thus draw upon the infrastructure of the site in order to achieve more reliable path planning, or else path planning can be performed autonomously by the vehicle, for example if a management system is not currently available or is not provided.

Provision can preferably furthermore be made whereby vehicle information items relating to the vehicle are transmitted to the management system of the confined site for the purposes of specifying the path, such that the management system can identify in advance whether or not a steering system that is controllable in automated fashion is available in the vehicle. For example, a wireless network of the confined site can be used for this purpose. If a steering system that is controllable in automated fashion is available, the planning of the path is then possible in the conventional manner, without the additional limitations that arise from steering braking. If no steering system that is controllable in automated fashion is available, which can be derived by the management system from the vehicle information items, the path planning is then performed as described above. The management system can thus automatically initiate the relevant path planning routine in accordance with the determined vehicle equipment specification.

Provision is preferably furthermore made whereby the path and/or the destination area are/is specified in a manner dependent on obstructions and/or other vehicles within the confined site. It can be taken into consideration here that, owing to the limitations imposed by the steering braking function on the settable steering angle, for example, certain shunting maneuvers are more complicated or impossible, wherein it can also be considered that the vehicle can be in motion for a steering movement. The path, and the destination area, can be specified or selected accordingly.

Provision is preferably furthermore made whereby, prior to the automated control of the drive system and of the brake system using the control signals, it is checked whether a vehicle mass of the vehicle is lower or higher than a specified limit mass, for example 31t (tonnes). Excessive wear that may occur in the case of particularly heavy vehicles can thus be avoided. Provision is preferably made whereby automated generation of the steering braking control signal and/or automated control of the brake system of the vehicle using the steering braking control signal, that is to say steering braking, is allowed only if the vehicle mass is lower than the limit mass. Steering braking is thus suppressed, and the vehicle can be steered manually to the destination area as necessary, for example until the vehicle mass is below the limit mass again after the unloading operation.

Provision is preferably furthermore made whereby, at least during the automated control of the brake system using the steering braking control signal, a brake temperature at least of those brakes which are controlled in automated fashion is monitored, wherein automated generation of the steering braking control signal and/or automated control of the brake system of the vehicle using the steering braking control signal, that is to say steering braking, is maintained only if the brake temperature is below a temperature limit value. Additional monitoring of wear, which can be derived from an elevated brake temperature, is thus possible.

Provision can preferably furthermore made whereby a steering braking duration is ascertained which indicates the length of time for which automated control of the brake system using the steering braking signal has been performed for the purposes of traveling along the path in automated fashion by way of steering braking, wherein automated generation of the steering braking control signal and/or automated control of the brake system of the vehicle using the steering braking control signal, that is to say steering braking, is maintained only until such time as the steering braking duration exceeds a specified limit duration. Wear can be estimated in this way, too, because an increased duration for steering braking is a sign of excessive wear. This can also be combined with the temperature monitoring described above. In principle, the wear can also be estimated solely on the basis of the steering braking duration.

Provision is preferably furthermore made whereby a loading ramp or an unloading location or a parking space is situated in the destination area. Flexible use of the method is thus realized, which method can be implemented not only within a depot or a haulage depot but also within a rest area or a port site.

Figure 1A:
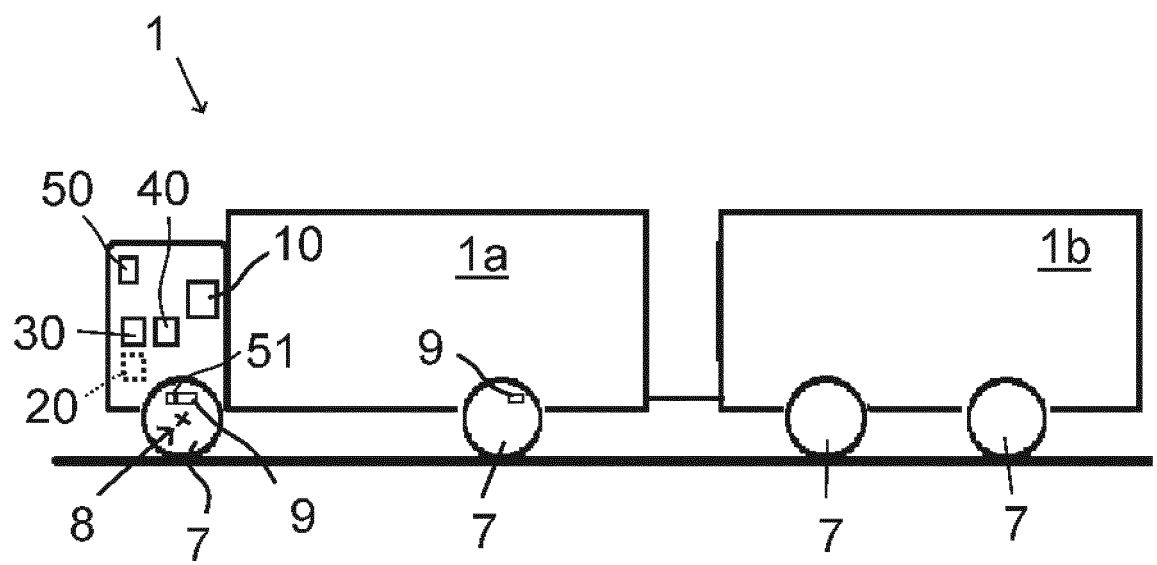
FIG. 1a illustrates a schematic view of a vehicle.

FIG. 1a schematically shows a vehicle 1 which includes a tractor vehicle 1a and a trailer 1b coupled thereto, and which, as per FIG. 1, is situated within a confined site 2, for example a depot 2a (haulage depot) or a rest area or a port site. The confined site 2a is controlled and coordinated by a management system 3, which in particular ensures that arriving vehicles 1 are directed from a starting area 4 along a specified path P to a defined destination area 5, for example to a specified loading ramp 5a.

For this purpose, the path P is planned or specified by the management system 3 in a manner dependent on certain vehicle information items I1, which many for example include a payload, an authorization, a destination, a vehicle equipment specification etc., and is transmitted via an arbitrary communication system 6, for example a static and local wireless network 6a (for example WLAN), to a vehicle control unit 10 in the relevant vehicle 1. Then, by controlling the relevant system components of the vehicle 1 using control signals, the vehicle control unit 10 ensures that the vehicle 1 moves in automated fashion along the specified path P to the destination area 5.

Here, the path P is specified in particular in accordance with the vehicle equipment specification, from which it can be derived what system components the vehicle control unit 10 can control in order to follow the specified path P. The manner in which the vehicle 1 can be autonomously controlled on the confined site 2 can thus be taken into consideration. For example, if no steering system 20 which is controllable in automated fashion, and by means of which a steering angle d of the wheels 7 of a steerable vehicle axle 8, in particular the front axle of the vehicle 1, can be actively set, is available in the vehicle 1, this can be correspondingly taken into consideration in the planning of the path P by the management system 3 such that even a vehicle 1 of the type in question can be incorporated into the automated course of events within the depot 2a.

Figure 2:
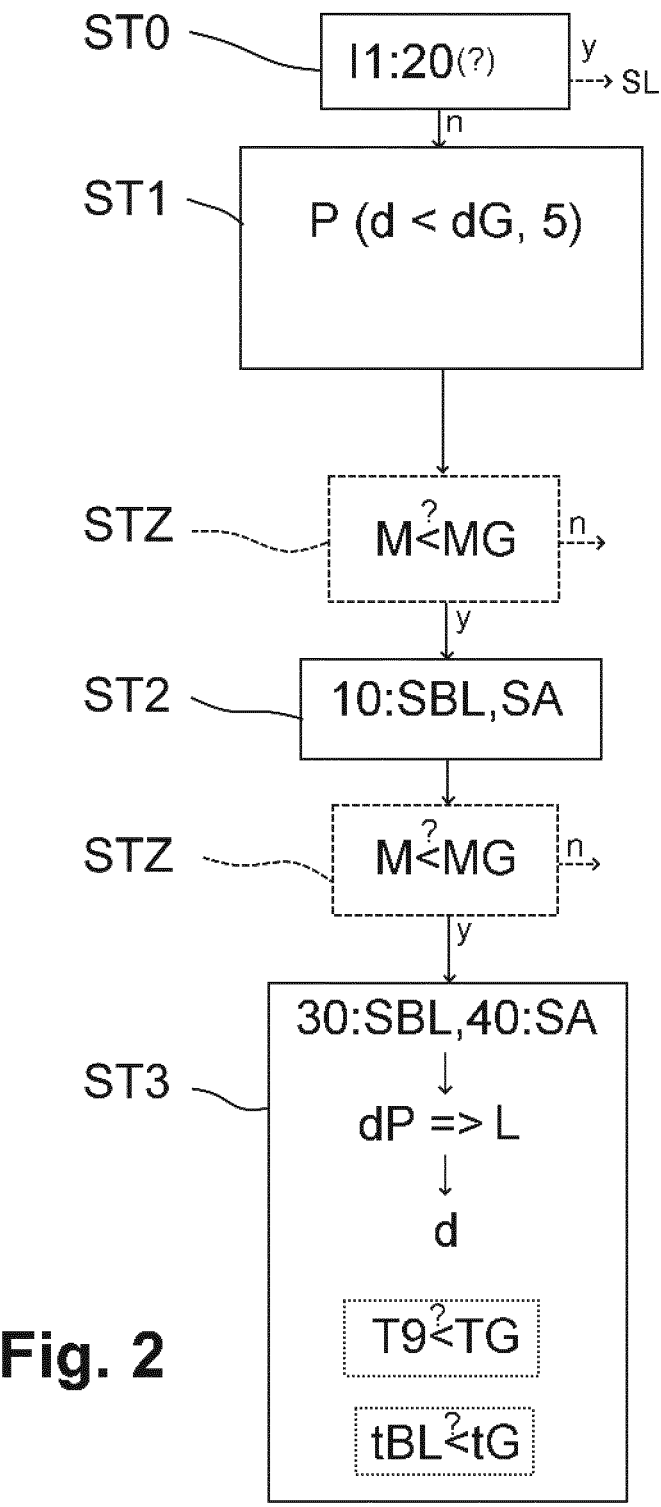
FIG. 2 illustrates a flow diagram of a method according to an embodiment of the invention.

Under these conditions, in the context of a method for controlling the vehicle 1 within the confined site 2, in particular the depot 2a, it is for example the case that the following approach is provided, as per the flow diagram in FIG. 2:

Firstly, in an initial step ST0, the management system 3 ascertains, on the basis of the vehicle information items I1, whether a steering system 20 that is controllable in automated fashion is available, that is to say is present in the vehicle 1 and is correspondingly also functional. If this is the case, the path P can be planned by the management system 3 in the conventional manner such that the vehicle 1 is moved along the path P by automated control of the steering system 20, which is controllable in automated fashion, using steering control signals SL, of the drive system 30, which is controllable in automated fashion, using drive control signals SA, and of the brake system 40, which is controllable in automated fashion, using braking control signals SB. Here, the relevant control signals SA, SB, SL are also generated in automated fashion by the control unit 10 in accordance with the path P. The infrastructure within the depot 2a is used, that is to say obstructions H and other stationary or moving vehicles 100 are identified and taken into consideration, in the specification of the path P.

If no steering system 20 that is controllable in automated fashion is available in the vehicle 1, because such a system is not present or has a defect, then in a first step ST1 in the specification of the path P from the starting area 4 to the destination area 5 by the management system 3, it is taken into consideration that steering of the vehicle 1 by setting of a particular steering angle d at the wheels 7 of the steered vehicle axle 8 is possible only in the context of a steering braking function.

In principle, the initial checking step ST0 and the first step ST1 for specifying the path P can also be performed by the control unit 10 itself, wherein, rather than drawing upon the infrastructure of the depot 2a, a sensor system 50 having the sensor equipment in the vehicle 1 is used to plan and specify the path P. The vehicle information items I1, in particular the vehicle equipment specifications, are known to the control unit 10 itself, such that the planning and specification of the path P can also be performed from this aspect.

In a subsequent second step ST2, the control unit 10 will then, instead of the steering control signals SL for automated steering of the vehicle 1, generate steering braking control signals SBL for the purposes of influencing the steering angle d of the wheels 7 of the steered vehicle axle 8, with a drive control signal SA simultaneously also being generated, because steering braking is possible only whilst the vehicle 1 is traveling (forwards or backwards). Then, in a third step ST3, said generated steering braking control signals SBL and drive control signals SA are transmitted in automated fashion to the brake system 40 and to the drive system 30, whereupon, whilst the vehicle 1 is in motion, wheel-specific control of the brakes 9, in particular at the wheels 7 of the steered vehicle axle 8, results in a particular steering moment L being exerted on the vehicle 1, which steering moment, owing to the positive scrub radius at the wheels 7 of the steered vehicle axle 8, cause said wheels 7 to turn by a particular steering angle d, causing the driven vehicle 1 to be steered.

The steering braking control signals SBL are generated such that a differential brake pressure dP is established at the wheels 7 of the steered vehicle axle 8 through wheel-specific control of the brakes 9, wherein the brake pressure is ideally zero at one of the brakes 9 of the steered vehicle axle 8 so as not to exert undue load on the brakes 9. Correspondingly to said differential brake pressure dP, a steering angle d is set at the wheels 7 of the steered vehicle axle 8 by way of the steering moment L that is established (and by way of the positive scrub radius), which steering angle in turn implements the steering specification at the relevant position of the path P in automated fashion. The specified path P can thus be traveled along through automated control of the brake system 40, using the steering braking control signal SBL, and of the drive system 30, using the drive signals SA. Braking or driving of the vehicle 1 is achieved here by way of a superposition of the drive control signal SA or of the braking control signal SB with the steering braking control signal SBL.

Since efficient steering of the vehicle 1 is possible to a lesser degree, or only up to a limit steering angle dG of for example 20°, by way of steering braking, this can be taken into consideration in the specification of the path P by the management system 3 in the first step ST1. Although steering angles d greater than a limit steering angle dG of 20° can be implemented by way of the described steering braking, this is possible only with increased wear of the respectively controlled brakes 9. It can therefore also be taken into consideration that steering braking results in increased wear of the particular brakes 9 that are controlled for the purposes of steering braking. Accordingly, the path P can for example be specified such that it has only a small number of curve sections KA and/or has only curve sections KA with a low degree of curvature K, such that the differential brake pressure dP that is set, and accordingly also the absolute brake pressures at the relevant brakes 9, are of lesser magnitude.

Under some circumstances, it is also necessary to take into consideration the specification of the destination area 5 at which, for example, a payload is to be picked up or set down. Here, it can for example be taken into consideration that, when resorting to steering braking in the manner described above, maneuvering of a vehicle 1 without a steering system 30 that is controllable in automated fashion to a free loading ramp 5a between two loading ramps 5a that are already occupied by other vehicles 100 is highly complicated and is possible only with a large number of curve sections KA. Therefore, in this situation, the path P should be selected using a correspondingly different loading ramp 5a as a destination area 5, in the case of which fewer curve sections KA and/or curve sections KA with a lesser degree of curvature K are required.

Before or after the specification of the path P for the automated control of the vehicle 1 using the steering braking function (first step ST1), it is additionally possible for a vehicle mass M of the vehicle 1 to be acquired, for example from pressure information items from an air suspension system and/or from some other mass estimation, in order to allow the subsequent automated control of the vehicle 1 in accordance with this. In an intermediate step STZ, it is checked for this purpose whether the acquired vehicle mass M is higher than a limit mass MG of for example 31t. Only if the limit mass MG is undershot is automated generation of the steering braking control signal SBL and/or automated control of the brake system 30 using the steering braking control signal SBL subsequently allowed in the steps ST2 and ST3. It is equivalently possible for the steering braking function to be permanently allowed, wherein the steering braking function is suppressed by the control unit 10 if the limit mass MG is overshot.

It is thus taken into consideration that implementation of the steering braking function in the case of very heavy vehicles 1 can lead to a very high degree of wear of the brakes 9. In the case of a vehicle 1 having a vehicle mass M higher than the limit mass MG, the vehicle 1 can therefore be driven independently or manually within the depot 2a to the destination area 5. This is then for example a route on which the vehicle 1 is fully laden (incoming route before unloading at the destination area 5 or return route after loading at the destination area 5), whereas the route before loading or after unloading could be covered in automated fashion if the vehicle mass M is lower than the limit mass MG.

When the path P is traveled along using the steering braking function, temperature monitoring can additionally be provided. For this purpose, a temperature sensor arrangement 51 is arranged at the brakes 9. If a brake temperature T9 of individual brakes 9 exceeds a temperature limit value TG, automated generation of the steering braking control signal SBL and/or automated control of the brake system 30 using the steering braking control signal SBL is disallowed, or the steering braking function is suppressed, in the steps ST2 and ST3.

A steering braking duration tBL for which the brakes 9 are controlled for the purposes of implementing the steering braking function can additionally or alternatively be measured, for example by an automated function in the brake system 30 and/or by the control unit 10. If a limit duration tG is overshot, then it is also the case independently of the level of the brake temperature T9 that automated generation of the steering braking control signal SBL and/or automated control of the automated brake system 30 using the steering braking control signal SBL is disallowed, or the steering braking function is suppressed, in the steps ST2 and ST3. Excessive wear is thus avoided irrespective of the brake temperature T9.

Instead of specifying the path P for maneuvering to a loading ramp 5a, provision can also be made for unloading of bulk material at an unloading location 15, wherein it is then also the case that the path P can be correspondingly selected under the above-described conditions with regard to steering braking.

Through corresponding control of the relevant system components 20, 30, 40 by the control unit 10, the path P can be traveled in automated fashion, wherein the control unit 10 can use a sensor system 50 having the corresponding sensor equipment in the vehicle 1 to correspondingly monitor this automated journey, and can for example perform an actual-setpoint comparison of the position of the vehicle 1 and/or identify obstructions.

When the vehicle 1 has subsequently, in a fourth step ST4, arrived at the destination area 5 in the correspondingly intended pose (orientation, position), the relevant task can be performed, for example loading, unloading, servicing activities, etc., before the vehicle 1 is subsequently moved again on a specified path P to a further destination, or back to the original starting area 4 in order to exit the depot 2a.

Instead of a depot 2a as described, the method can also be implemented within a rest area as a confined site 2, wherein the driver sets down the vehicle 1 at the rest area entrance (starting area 4) and the vehicle 1 is subsequently maneuvered autonomously, using steering braking, into a free parking space 16 (destination area 5) that can be reached using the steering braking function.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS (PART OF THE DESCRIPTION)

1 Vehicle
1a Tractor vehicle
1b Trailer
2 Confined site
2a Depot
3 Management system
4 Starting area
Destination area 5a Loading ramp
6 Communication system
6a Wireless network
7 Wheel
8 Steerable vehicle axle
9 Brake
10 Vehicle control unit
15 Unloading location
16 Parking space
20 Steering system with automated control capability
30 Drive system with automated control capability
40 Brake system with automated control capability
50 Sensor system
51 Temperature sensor arrangement
100 Other vehicles
d Steering angle
dG Limit steering angle
dP Differential brake pressure
H Obstruction
M Vehicle mass
MG Limit mass
I1 Vehicle information item
P Path
K Curvature
KA Curve section
L Steering moment
SA Drive control signal
SB Braking control signal
SBL Steering braking control signal
tBL Steering braking duration
tG Limit duration
T9 Brake temperature
TG Limit temperature
ST0, ST1, ST2, ST3, ST5, STZ Steps of the method

The invention claimed is:

1. A method for controlling a vehicle within a confined site, the confined site being a depot, wherein the vehicle has a control unit that is designed to control a brake system and a drive system in the vehicle in automated fashion in order to move the vehicle in automated fashion along a specified path, the method comprising:
determining that the vehicle does not include a steering system that can be controlled by way of steering control signals generated in automated fashion in order to influence a steering angle of wheels of a steered vehicle axle of the vehicle in automated fashion, and subsequently carrying out at least the following steps:
specifying a path between a starting area and a specified destination area within the confined site, and
generating drive control signals and steering braking control signals such that, during subsequent automated control of the drive system and of the brake system using the control signals, the vehicle moves from the starting area along the path to the specified destination area, and the steering angle varies owing solely to automated control of brakes of the brake system,
wherein the path and/or the destination area are/is specified in a manner dependent on obstructions and/or other vehicles within the confined site.

2. The method as claimed in claim 1, wherein the path is specified such that, during automated control of the brake system using the steering braking control signals for moving the vehicle along the path, the steering angle at the wheels of the steered vehicle axle remains below a specified limit steering angle.

3. The method as claimed in claim 2, wherein the limit steering angle is 20°.

4. The method as claimed in claim 1, wherein the path is specified by a management system on a controller in the vehicle.

5. The method as claimed in claim 4, wherein vehicle information items relating to the vehicle are transmitted to the management system for specifying the path, such that the management system can identify in advance whether a steering system that is controllable in automated fashion is available in the vehicle.

6. The method as claimed in claim 1, wherein, the specification of the path is based on the steering angle at the wheels of the steered vehicle axle only being influenced by automated control of the brakes of the brake system in the vehicle.

7. The method as claimed in claim 1, wherein, prior to the automated control of the drive system and of the brake system using the control signals, it is checked whether a vehicle mass of the vehicle is lower or higher than a specified limit mass.

8. The method as claimed in claim 7, wherein automated generation of the steering braking control signal and/or automated control of the brake system of the vehicle using the steering braking control signal is allowed only if the vehicle mass is lower than the specified limit mass.

9. The method as claimed in claim 1, wherein, at least during the automated control of the brake system using the steering braking control signal, a brake temperature at least of the brakes which are controlled in automated fashion is monitored, and wherein automated generation of the steering braking control signal and/or automated control of the brake system of the vehicle using the steering braking control signal is maintained only if the brake temperature is below a temperature limit value.

10. The method as claimed in claim 1, wherein a steering braking duration is ascertained which indicates a length of time for which automated control of the brake system using the steering braking signal has been performed for the purposes of traveling along the path in automated fashion, wherein automated generation of the steering braking control signal and/or automated control of the brake system of the vehicle using the steering braking control signal is maintained only until such time as the steering braking duration exceeds a specified limit duration.

11. The method as claimed in claim 1, wherein the steering braking control signal is generated such that, during automated control of the brake system using the steering braking control signal, the brakes are controlled on a wheel-specific basis such that a differential brake pressure is generated between wheels of the same vehicle axle, which results in a steering moment and causes a steering angle associated with the differential braking pressure to be set at the wheels of the steered vehicle axle.

12. The method as claimed in claim 1, wherein a loading ramp or an unloading location or a parking space is situated in the destination area.

13. The method as claimed in claim 1, wherein the determination of whether no steering system that is controllable in automated fashion is available in the vehicle is performed in the starting area of the confined site.

14. A control unit for a vehicle for carrying out the method as claimed in claim 1, wherein the control unit is designed to control the brake system and the drive system in the vehicle in automated fashion in order to move the vehicle in automated fashion along the specified path, wherein the control unit is designed to generate the drive control signals and steering braking control signals such that, during automated control of the drive system and of the brake system using the drive control signals and steering braking control signals, the vehicle moves from the starting area along a previously specified path to the specified destination area, and the steering angle varies owing solely to automated control of the brakes of the brake system, wherein, in a specification of a previously specified path between the starting area and the specified destination area within the confined site, it is taken into consideration that the steering angle at the wheels of the steered vehicle axle can only be influenced by automated control of the brakes of the brake system in the vehicle.

15. The control unit as claimed in claim 14, wherein the control unit is configured to itself ascertain the specified path or to receive the specified path from a management system of the confined site.

16. A vehicle, comprising:
a brake system;
a drive system; and
the control unit as claimed in claim 14.

17. The method as claimed in claim 7, wherein the specified limit mass is 31 tonnes.

18. The method as claimed in claim 1, wherein the path is specified by a management system of the confined site.

19. A method for controlling a vehicle within a confined site, the confined site being a depot, wherein the vehicle has a control unit that is designed to control a brake system and a drive system in the vehicle in automated fashion in order to move the vehicle in automated fashion along a specified path, the method comprising:

following a determination that there is no steering system available in the vehicle that can be controlled by way of steering control signals generated in automated fashion in order to influence a steering angle of wheels of a steered vehicle axle of the vehicle in automated fashion, carrying out at least the following steps:
specifying a path between a starting area and a specified destination area within the confined site, and
generating drive control signals and steering braking control signals such that, during subsequent automated control of the drive system and of the brake system using the control signals, the vehicle moves from the starting area along the path to the specified destination area, and the steering angle varies owing solely to automated control of brakes of the brake system, wherein the path is specified by a management system of the confined site, and wherein vehicle information items relating to the vehicle are transmitted to the management system of the confined site for specifying the path, such that the management system can identify in advance whether a steering system that is controllable in automated fashion is available in the vehicle.

* * * * *